US011798341B1

(12) United States Patent
Fernandez et al.

(10) Patent No.: US 11,798,341 B1
(45) Date of Patent: Oct. 24, 2023

(54) AUTHENTICATION BASED ON THROUGH-BODY SIGNALS

(71) Applicant: United Services Automobile Association (USAA), San Antonio, TX (US)

(72) Inventors: Amanda S. Fernandez, San Antonio, TX (US); Rick Swenson, Bradenton, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/331,157

(22) Filed: May 26, 2021

Related U.S. Application Data

(63) Continuation of application No. 16/932,451, filed on Jul. 17, 2020, now Pat. No. 11,049,348, which is a continuation of application No. 16/526,805, filed on Jul. 30, 2019, now Pat. No. 10,755,512, which is a continuation of application No. 16/289,248, filed on Feb. 28, 2019, now Pat. No. 10,410,446, which is a
(Continued)

(51) Int. Cl.
*G07C 9/37* (2020.01)
*H04B 13/00* (2006.01)

(52) U.S. Cl.
CPC .............. *G07C 9/37* (2020.01); *H04B 13/005* (2013.01)

(58) Field of Classification Search
CPC ...... G07C 9/37; H04B 13/005; A61H 23/004; A61H 2205/027; H04W 4/80; H04W 12/06; H04W 12/08
See application file for complete search history.

(56) References Cited

U.S. PATENT DOCUMENTS 5,229,764 A * 7/1993 Matchett ............. H04W 12/126
340/5.74
6,731,778 B1 5/2004 Oda et al.
(Continued)

FOREIGN PATENT DOCUMENTS

WO WO-2012154230 A1 * 11/2012 ............. G01P 15/00

OTHER PUBLICATIONS

Mujibiya, Adiyan, "Heptic Feedback Companion for Body Area Network Using Body-Carried Electrostatic Charge," Rakuten Institute of Technology, Rakuten Inc., Tokyo, Japan, 2015, pp. 571-572.

*Primary Examiner* — Vernal U Brown
(74) *Attorney, Agent, or Firm* — Fletcher Yoder, P.C.

(57) ABSTRACT

Techniques are described for user authentication based on a signal that is transmitted through an individual's body, and detected using device(s) in physical contact with the individual. A signal, such as an electrical signal or a vibrational signal, may be transmitted from a first device and received by a second device that is in physical contact with the individual. The received signal may be employed to determine a body signature for the individual. The body signature may identify the individual among a population of individuals, given the particular alterations to the propagating signal caused by the individual's physiology. Accordingly, the body signature may be employed as a form of biometric data that is useable to authenticate the individual to access a secure area, log in to a device or an application, or for other purposes.

18 Claims, 4 Drawing Sheets

Related U.S. Application Data continuation of application No. 15/643,070, filed on Jul. 6, 2017, now Pat. No. 10,255,738.

(60) Provisional application No. 62/366,349, filed on Jul. 25, 2016.

(56) References Cited

U.S. PATENT DOCUMENTS

| | | |
|---|---|---|
| 8,031,085 B1 | 10/2011 | Anderson |
| 9,510,357 B1 | 11/2016 | Egner et al. |
| 9,712,929 B2 | 7/2017 | Amento et al. |
| 9,736,180 B2 | 8/2017 | Baldwin et al. |
| 10,255,738 B1 | 4/2019 | Fernandez et al. |
| 2002/0073032 A1 | 6/2002 | Holmes et al. |
| 2004/0215968 A1* | 10/2004 | Rodwell ............... H04M 1/67 713/186 |
| 2006/0224072 A1 | 10/2006 | Shennib |
| 2008/0001735 A1 | 1/2008 | Tran |
| 2008/0114501 A1 | 5/2008 | Wu |
| 2013/0095459 A1 | 4/2013 | Tran |
| 2013/0278414 A1* | 10/2013 | Sprigg ................ A61B 5/746 340/539.12 |
| 2014/0364681 A1* | 12/2014 | Hillbratt ............. H04R 25/453 600/25 |
| 2015/0137936 A1 | 5/2015 | Baldwin et al. |
| 2015/0150116 A1 | 5/2015 | Baldwin et al. |
| 2015/0287296 A1 | 10/2015 | Hall et al. |
| 2015/0296480 A1 | 10/2015 | Kinsey et al. |
| 2015/0301644 A1 | 10/2015 | Walley |
| 2016/0109951 A1 | 4/2016 | Baldwin et al. |
| 2016/0179877 A1 | 6/2016 | Koerner et al. |
| 2016/0279021 A1* | 9/2016 | Hyde ................ A61H 23/0245 |
| 2016/0292584 A1 | 10/2016 | Weinberg et al. |
| 2016/0360336 A1 | 12/2016 | Gross et al. |
| 2016/0360382 A1 | 12/2016 | Gross et al. |
| 2017/0262064 A1 | 9/2017 | Ofir et al. |
| 2017/0289145 A1* | 10/2017 | Boesen ............... H04R 1/1016 |
| 2017/0308902 A1 | 10/2017 | Quiroga et al. |
| 2018/0035909 A1 | 2/2018 | Hadley et al. |
| 2018/0049028 A1 | 2/2018 | Tali et al. |
| 2018/0096547 A1 | 4/2018 | Robertson et al. |
| 2018/0146266 A1 | 5/2018 | Stoddard et al. |
| 2019/0028468 A1 | 1/2019 | Garcia |

* cited by examiner

AUTHENTICATION BASED ON THROUGH-BODY SIGNALS

CROSS-REFERENCE TO RELATED APPLICATION

This application is a continuation of U.S. patent application Ser. No. 16/932,451, titled "Authentication Based on Through-Body Signals," filed on Jul. 17, 2020, which claims priority to and benefit of U.S. patent application Ser. No. 16/526,805, titled "Authentication Based on Through-Body Signals Detected in Body Area Networks," filed on Jul. 30, 2019, which claims priority to and benefit of U.S. patent application Ser. No. 16/289,248, titled "Authentication Based on Through-Body Signals Detected in Body Area Networks," filed on Feb. 28, 2019, which claims priority to and benefit of a continuation of U.S. patent application Ser. No. 15/643,070, titled "Authentication Based on Through-Body Signals Detected in Body Area Networks," filed on Jul. 6, 2017, which claims priority to and benefit of U.S. Provisional Patent Application Ser. No. 62/366,349, titled "Authentication Based on Through-Body Signals Detected in Body Area Networks," filed on Jul. 25, 2016, the entireties of each are incorporated by reference into the present disclosure.

BACKGROUND

Organizations and individuals that operate and/or manage computing systems may implement various security measures to prevent unauthorized individuals, devices, and processes from accessing secured data stored on the systems, gaining control of processes executing on the systems, introducing new (e.g., malicious) processes to the systems, and/or gaining access for other purposes. Traditionally, a user may provide one or more credentials to gain access to a system. Such credentials may include a username, password, and/or personal identification number (PIN). By comparing the supplied credentials with previously established credentials for the user, a determination may be made whether to permit or deny the requested access. In some instances, tokens such as cryptographic keys may be employed to authenticate an individual and/or verify that an individual or process is authorized to access a system. Cryptographic keys may also be employed to secure communications over a network.

SUMMARY

Implementations of the present disclosure are generally directed to authentication of individuals using biometric and/or biologically determined information. More specifically, implementations are directed to determining a body signature for an individual based on the propagation of a signal through an individual's body, and employing the body signature to authenticate the individual for secure access to a device, stored data, an application, and/or an access-controlled physical space.

In general, innovative aspects of the subject matter described in this specification can be embodied in methods that include actions of: receiving a signal that is transmitted, through at least a portion of a body of an individual, from a sending device to a receiving device while the sending device and the receiving device are both in physical contact with the individual; determining a body signature for the individual based at least partly on an alteration of the signal that is caused by propagation of the signal through at least the portion of the individual; and providing the body signature to authenticate the individual.

Implementations can optionally include one or more of the following features: the sending device and the receiving device are included in a body area network (BAN) that is proximal to the individual; the receiving device includes an epidermal patch configured to receive the signal; the epidermal patch communicates the signal to a portable computing device over a wireless network; the receiving device is a portable computing device; the signal is an electrical signal; the signal is a vibrational signal; the sending device is communicatively coupled to a door controller mechanism that controls a door; the operations further comprise: m response to authenticating the individual, sending an access signal to instruct the door controller mechanism to open the door to provide access to the individual; and/or the actions further include, in response to authenticating the individual, sending an access signal to enable the individual to access at least a portion of a client application executing on the sending device, the receiving device, or a computing device that is communicatively coupled to at least one of the sending device or the receiving device.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. By authenticating an individual using their body signature that is determined based on a signal propagated through the individual's body, implementations provide an authentication technique that is unobtrusive and easy from the perspective of the individual being authenticated, with minimal effort required from the individual. This provides a more positive user experience compared to traditional techniques in which the individual may be required to remember and enter a username, password, personal identification number (PIN), answers to knowledge-based questions (e.g., what is your mother's maiden name?), and/or other credential(s). Moreover, implementations provide an authentication technique that is more secure and less vulnerable to spoofing compared to traditional authentication methods. Traditional user credentials (e.g., password, PIN, etc.) may be guessed or stolen, but a body signature based on signal propagation through the individual's body would be much more difficult to spoof Implementations further inhibit spoofing by correlating known and ongoing real-time bio-signal analysis from the user and device(s) on in a body area network (BAN) of the user. For example, a user may be wearing a heart rate monitor, as a standalone sensor, fitness tracking device, wearable computer, and so forth. The monitor may communicate current heart rate information to the BAN and, based on this information, a determination may be made that the user is alive and that the determined body signature of the user is not pre-recorded as in a replay attack.

Implementations provide further technical improvements and advantages over traditional authentication systems. Because traditional systems may require users to accurately remember and enter user credentials (e.g., username, password, PIN, etc.), traditional systems are susceptible to failed attempts at authentication caused by wrong, mistyped, or forgotten credentials. By providing an authentication technique that does not require the user to accurately remember and enter credentials, implementations may reduce or eliminate authentication failures, which can also be described as reducing friction. Accordingly, implementations avoid the expenditure of processing capacity, memory, storage space, network bandwidth, and/or other computing resources that traditional systems need to expend to recover from failed authentication attempts, and/or to process multiple authentication attempts as the user attempts to remember and correctly enter the appropriate credential(s). Implementations may surpass and/or bypass (e.g., leapfrog) traditional secure methods, such as the use of signatures (e.g., written or digital) or credentials, by providing passive authorization and/or authentication based on a detected body signature of the user.

Implementations also provide technical advantages over other, previously available biometric authentication techniques. Retinal/iris scanners have the potential to degrade the user's vision over time. Scanners for handprints, palms, and fingers can be spoofed by lifting the print from another surface (for example using tape on a cell phone). Facial recognition has its own points of failure, aside from the fact that the user can fail to authenticate due to lighting variations, as well as changes of hair style, glasses, and so forth. Implementations overcome and/or improve on these shortcomings in traditional techniques through use of the body signature described herein.

Implementations may employ artificial intelligence and/or machine learning techniques for biometric authentication and/or correlation of bio-signal data (e.g., a body signature). For example, the software that creates, processes, retrieves, and/or examines the body signature may maintain dynamic profiles with markers that remain the same over time, or markers that change over time, and the software may have the capability to decide and learn these markers.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
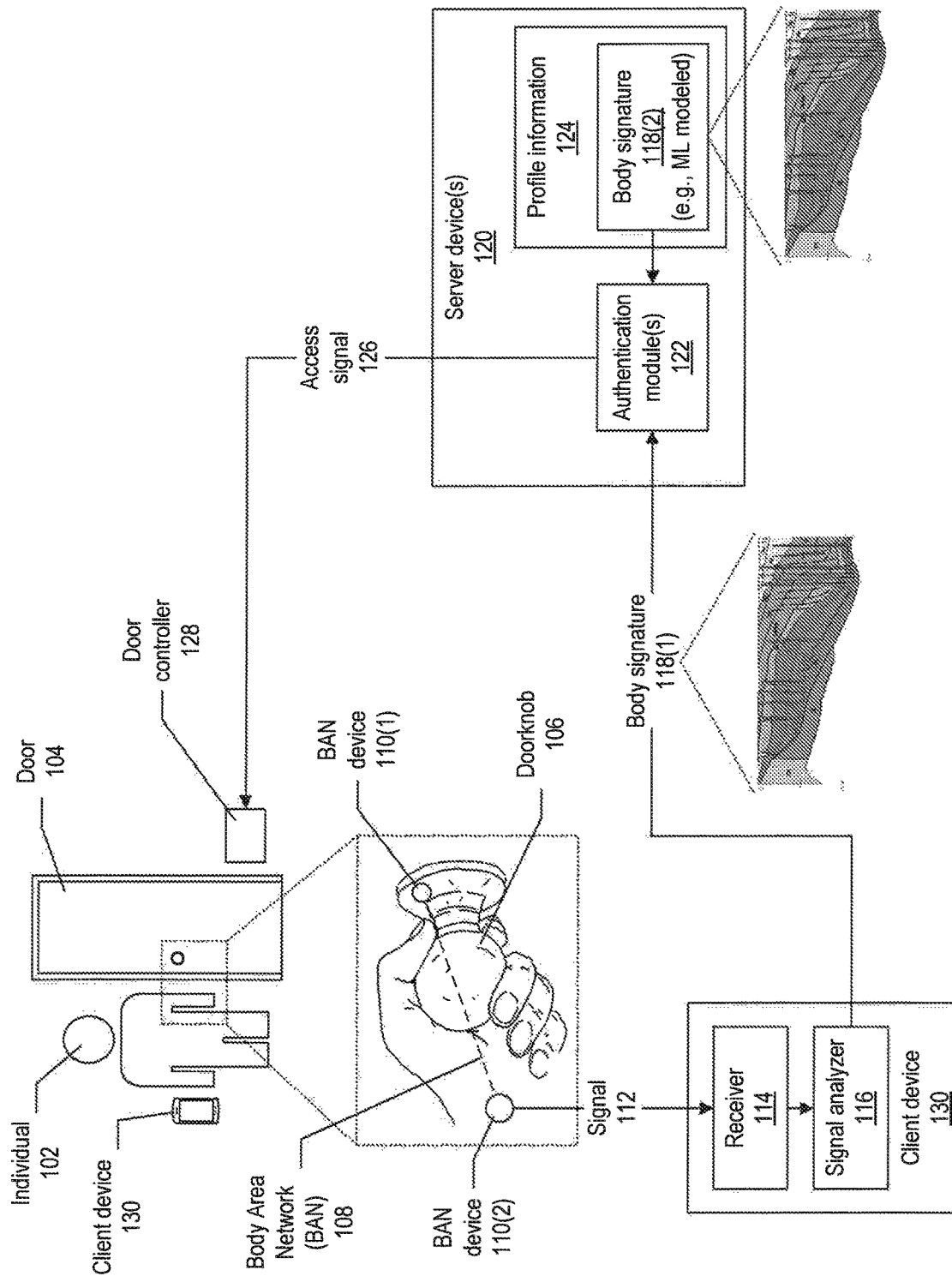
FIG. 1 depicts an example system for authentication based on a signal transmitted through an individual's body, according to implementations of the present disclosure.

Implementations of the present disclosure are directed to systems, devices, methods, and computer-readable media for authenticating an individual based on a signal that is transmitted through at least a portion of an individual's body, and that is detected using one or more device(s) that are in physical contact with the individual. A signal, such as an electrical signal or a vibrational signal, may be transmitted from a first device that is in physical contact with the individual. The signal may be received by a second device that is in physical contact with the individual. During its propagation through at least a portion of the individual's body, the signal may be altered based on the particular physiology of the individual. The received signal may be employed to determine a body signature for the individual. In some instances, the body signature for an individual may uniquely identify the individual among a population of individuals, given the particular alterations to the propagating signal caused by the individual's unique physiology. Accordingly, the body signature may be employed as a form of biometric data that is useable to authenticate the individual (e.g., verify the individual's identity). Implementations may be employed to authenticate the individual to gain access to secure data, log in to an application, gain access to use a computing device, activate a smart appliance or other device, gain access to a physical space (e.g., open a door), authorize a payment, and/or for other purposes.

In some implementations, the transmitting device and/or receiving device may be included in a wireless network of devices such as a body area network (BAN) in proximity to the individual. A BAN may include any suitable number of BAN devices such as wearable computing devices (e.g., watches, glasses, footwear, gloves, patches on the skin, smart jewelry, smart contact lenses, etc.), implanted computing devices (e.g., implanted medical devices, pacemakers, hearing aids, dentures, fillings, crowns, etc.), and/or other devices that are carried or otherwise conveyed by the individual (e.g., smartphones, tablets, etc.). A BAN may also include devices that are touched by the individual even if they are not worn by, carried by, or implanted in the individual. For example, a BAN may include a transmitter and/or sensor in a doorknob that is configured to send and/or detect a signal that propagates through the individual, as described further herein. The devices included in the BAN may communicate with one another wirelessly using any suitable wireless communication protocol, such as a version of BlueTooth™, BlueTooth™ Low Energy (BLE), WiFi™ (e.g., IEEE 802.11b, g, n, etc.), Near Field Communication (NFC) protocols, or others. As used herein, physical contact between a device and an individual may include contact between at least a portion of the device and at least a portion of at least one part of the individual's body. Physical contact may include contact with the individual's skin, bone, fingernails, toenails, cartilage, tendon, internal organs, external organs, and/or other physical aspects of the individual. Physical contact may also include contact with the individual's perspiration, blood, saliva, and/or other bodily fluids.

In some implementations, the signal is a vibrational (e.g., haptic) signal. For example, an individual may touch a device that is configured to include one or more haptic actuators that cause a vibration. When the individual is in contact with the device, the vibration may create shock waves that propagate as a signal through the individual's body. In some instances, the signal may be detected by the same device that caused the vibration (e.g., that sent the signal), such that the detected signal is an echo or reflection of the original signal. In some instances, the signal may be detected by a different device, e.g., a device that is connected with the sending device over a BAN. As the vibration propagates through the individual's body, it may encounter various types of matter within the individual's body, such as bone, skin, organs, blood vessels, cartilage, and so forth, and such matter may alter the signal in a way that is unique to the individual. The alteration of the signal relative to the original signal may be employed to determine a body signature of the individual. In some implementations, the signal is a sonic signal such that the vibrations propagate through the body as sound waves and are detected by a sonic detector (e.g., microphone).

In some implementations, the signal is an electrical signal such as a (e.g., small) current that passes through the individual. For example, the individual may touch a device that includes a cathode (or anode) at a voltage differential compared to ground. When the individual touches the device, a current may flow through the individual's body between the device and another device (e.g., a wearable device in a BAN). The alteration of the electrical signal relative to the original signal may be caused by the particular electrical impedance of those portion(s) of the individual's body through which the signal passes. Such alteration may be employed to determine a body signature of the individual based on a comparison of the detected signal with the original signal. In some instances, the transmitted signal may include multiple components at different frequencies. The alteration of the various frequency components of the signal (e.g., based on the frequency-dependent impedance of the individual's body) may be used to determine the body signature of the individual.

In implementations where the signal is vibration or electrical, the signal may be of a strength and/or amplitude that is sufficient to propagate the signal through at least a portion of the individual's body. The signal may also be of a strength and/or amplitude such that the signal does not cause pain or undue discomfort for the individual.

In some implementations, the signal is an electrical signal. Moreover, the signal may be an electrostatic signal that operates similarly to an electrical signal, but time may factor into the calculation of the signal. For example, the user may touch a BAN device such as a doorknob, POS terminal, etc., and a static charge may build up over time in the user's body. The accumulated static charge may provide the signal used to determine the user's body signature, e.g., as the charge is discharged through a grounded BAN device. In some instances, such a signal may be employed to verify the user's identity for a transaction in involving the POS device or other device. For example, to make a payment, the authentication based on body signature may be completed within a window of time at a POS device. An implementation of an electrostatic current over one second or less with a resistance between 10A5 and 1QA8 ohms would be sufficient to generate the body signature, and would neither unduly discomfort the individual nor unduly delay the transaction in progress.

The body signature may be compared to a previously determined body signature of the individual and, based on a result of the comparison, the individual may be authenticated. In some implementations, the comparison may allow for some fuzziness and a correspondence between a current body signature and a previous body signature may be determined even in instances where there is not an exact match between the signatures. In some implementations, a correspondence is determined if there is a match between the signatures. In some implementations, machine learning (ML) may be employed to develop a model of various information that identifies the individual, such as the individual's body signature. A determined body signature of the individual may be compared to the model to authenticate the individual. In some implementations, the model is refined based on each instance of determining a body signature of the individual, to account for possible changes in the body signature over time. For example, an individual's body signature may change (e.g., gradually) over time as the individual ages, gains or loses weight, changes body composition (e.g., more or less muscle or fat), changes body chemistry, progresses through a pregnancy, and so forth. A body signature may also vary based on the individual's hydration level and/or water retention, and/or due to changes in humidity and resulting sweat on the surface of the skin.

The body signature may be employed in a variety of scenarios to authenticate the individual. For example, the individual may attempt to access a physical space such as their home, their office, an automated teller machine (ATM) vestibule, and/or other areas where access is limited to authorized individuals. The individual may touch a device that transmits a signal through the individual. The received signal may be analyzed to determine the individual's body signature, which may then be compared to a model body signature to verify the individual's identity. If the individual is successful authenticated based on the body signature, the individual may be permitted to access the area (e.g., a door may be opened, an elevator activated, etc.). The body signature may also be used to authenticate the user in other scenarios, including but not limited to the following: to access (e.g., unlock) a computing device; to access (e.g., log in to) an application; to activate a device such as a smart appliance, vehicle, and so forth; and/or to authorize a payment or other transaction through a point-of-sale (POS) terminal, ATM, vending machine, service kiosk, and so forth.

In each of these scenarios, there may be little or no explicit action required of the individual beyond the individual touching an object that transmits the signal. For example, when the individual picks up and holds their smartphone (or comes within proximity of a device while wearing a transmitter), the smartphone may be activated in response to a successful authentication of the individual based on their body signature. As another example, when the individual approaches a door and grasps a doorknob, the door may be opened in response to a successful authentication. As another example, when the individual grasps a vehicle steering wheel to begin driving, the vehicle may be activated in response to a successful authentication. As another example, when the individual attempts a purchase or other transaction, the individual may be prompted to touch a portion of the POS terminal or other device that sends the signal. The transaction may be allowed based the successful authentication of the individual.

In some implementations, an indication is provided to the individual to indicate the status of the access attempt. The indication may be a visual indication, an audio indication, a haptic (e.g., vibrational) indication, or other type of indication. For example, prior to grasping the doorknob, a display device such as a light panel, light-emitting diode (LED), or other type of display device may show a first output (e.g., a steady red light) indicating that the door is locked. In response to the individual grasping the doorknob, and the through-body signal being sent, the display device may show a second output (e.g., a flashing red light) indicating that authentication is being attempted. If the individual is authenticated for access, the display device may show a third output (e.g., a steady green light) indicating that access has been granted, and the access signal has been sent to door controller to unlock the door. If authentication is unsuccessful, the display device may show a fourth output or the first output again, to indicate access is denied. In some implementations, the indication includes an audio output in addition to or instead of the visual output, such as a sequence of beeps or tones of various pitches and/or durations to indicate the various stages of the authentication attempt.

As another example, some physical security protocols employ turn-style entries, revolving doors, and/or other mechanisms to prevent multiple individuals from entering a secure area following the grant of access based on credentials of one user. In such instances, the user can be prompted to touch the turn-style door or other object, the body signature may be measured and verified, and an indicator light or other output may be presented to indicate that the single user can pass through.

Similar status indications may also be provided in different scenarios in which a through-body signal is used to authenticate an individual, such as when the individual is attempting access to a POS terminal, an ATM, some other type of kiosk, a portable computing device (e.g., smartphone access), and/or an application executing on the individual's portable computing device.

Accordingly, implementations provide an authentication technique that is unobtrusive and easy from the perspective of the individual being authenticated, with minimal effort required from the individual. This provides a more positive user experience compared to traditional techniques in which the individual may be required to remember and enter a username, password, personal identification number (PIN), answers to knowledge-based questions (e.g., what is your mother's maiden name?), and/or other credential(s). Moreover, implementations provide an authentication technique that is more secure and less vulnerable to spoofing compared to traditional authentication methods. Traditional user credentials (e.g., password, PIN, etc.) may be guessed or stolen, but a body signature based on signal propagation through the individual's body would be much more difficult to spoof In instances where the body signature is generated in real time, it may be particularly difficult to spoof given that it may be generated for each instance of authentication and may not be permanently stored.

In some implementations, one or more passively detected indicators and/or markers may be determined for a user and compared to a known set of such indicator(s) and/or marker(s) for the user. For example, a user may hold their smartphone and the user's particular hand density and/or structure may determine the body signature used to identify the user, by comparing the determined body signature to registered signature for the user. Such a result may be used in conjunction with other body signature(s) and/or other biometric data collected from one or more other devices, including but not limited to: a headphone or hearing aid, to determine a signature based on a signal sent through the ear canal; a smart bracelet, to determine a signature based on the density, size, and/or other characteristics of the user's wrist; a smart pendant, to determine a signature based on the density and/or other characteristics of the user's chest; smart earrings, to determine a signature based on a signal sent through the earlobe and/or other metrics such as earlobe density, blood flow, heart rate, heart rhythm patterns, etc.; smart shoes, to determine a signature based on the density and/or other characteristics of the user's feet and/or other metrics such as the walking/running pace, cadence, patterns, pronation or supination of the feet, etc.; and/or a smart belt, to determine a signature based on the size, density, and/or other characteristics of the user's waist and/or other metrics such as cadence. Implementations may pair any suitable number of devices, and may employ one or many measurement results to verify the identity of the user.

FIG. 1 depicts an example system for authentication based on a signal transmitted through an individual's body, according to implementations of the present disclosure. In the example of FIG. 1, an individual 102 is attempting to access a secure space (e.g., home, office, ATM vestibule, etc.) through a door 104. The individual 102 may have a portable client device 130, such as a smartphone, tablet, wearable computer, and so forth. The individual 102 may be wearing a BAN device 110(2). In some examples, the BAN device 110(2) is an epidermal patch that is configured to adhere to the individual's skin, and that includes components for detecting and receiving a signal 112 (e.g., vibrational and/or electrical signal). The BAN device 110(2) may also include wireless network transceiver(s) to enable the BAN device 110(2) to communicate over a BAN 108 with the client device 130 and/or other device(s). In some implementations, the BAN device 110(2) may include hardware and/or software components for signal processing or other operations. Although the example of FIG. 1 shows the BAN device 110(2) as an epidermal patch device adhered to the user's wrist, implementations support any suitable type of BAN device 110 located in any suitable location on, near, and/or implanted inside the user's body.

The individual 102 may approach and grasp an object that is attached to or in proximity to the door 104. In the example of FIG. 1, the object is a doorknob 106 attached to the door 104. The doorknob 106 may include a BAN device 110(1) that is configured to send the signal 112. When the individual 102 is in physical contact with the doorknob 106, the BAN device 110(1) may send the signal 112. In some instances, the BAN device 110(1) may always be sending the signal 112 regardless of whether anyone is touching the doorknob 106. In some instances, the BAN device 110(1) may begin sending the signal 112 in response to detecting someone touching the doorknob 106. In some instances, the BAN device 110(1) may begin sending the signal 112 when the individual 102 is in proximity to the door 104. For example, the client device 130 may emit a signal (NFC, BLE, etc.) that indicates the proximity of the client device 130 and/or individual 102. The BAN device 110(1) may begin sending the signal 112 in response to detecting the proximity indication signal from the client device 130. As another example, the client device 130 may determine its location based on a satellite-based navigation system such as the global positioning system (GPS) or other system, and the client device 130 may communicate its location to the server device(s) 120. Based on the location, the server device(s) 120 may determine that the client device 130 and/or individual 102 is in proximity to the door 104 and, in response, the server device(s) 120 may send a signal to cause the BAN device 110(1) to begin transmitting the signal 112.

The signal 112 may propagate through the individual's body, or at least a portion thereof, to be received by the BAN device 110(2), e.g., an epidermal patch computing device worn by the individual 102. In some instances, the signal 112 may be conveyed through the individual's body independently of the BAN 108 that connects the BAN devices 110 using a wireless networking protocol, e.g., the signal 112 may be sent out-of-band with respect to the BAN 108.

In some implementations, the BAN device 110(2) may communicate the signal 112 to the client device 130 over the BAN 108. The client device 130 may include a receiver 114, such as a network interface controller (NIC) suitable to receive wireless communications over the BAN 108. The receiver 114 may provide the received signal 112 to a signal analyzer 116. In some implementations, the signal analyzer 116 may process the signal 112 to generate a body signature 118(1) of the individual based on the signal 112. For example, the signal analyzer 116 may extract a time portion of the signal 112 for use as the body signature 118(1). As another example, the signal analyzer 116 may compare the received signal 112 to the original signal sent by the BAN device 110(1), and the differential(s) between the two signals may be provided as the body signature 118(1). The signal analyzer 116 may also perform other types of processing on the signal 112 to generate the body signature 118(1), such as a Fourier transform from a time domain to a frequency domain. In some implementations, the received signal 112 itself may be provided as the body signature 118(1), e.g., without any signal processing on the client device 130.

The body signature 118(1) may be communicated, over one or more networks, to one or more server devices 120. In some implementations, an identifier of the individual 102 may also be sent to the server device(s) 120 as part of an access request and/or identity assertion. The server device(s) 120 may include any suitable number and type of computing device. FIG. 1 depicts an example in which the signal 112 is sent to the client device 130 over the BAN 108, and the client device 130 determines and sends the body signature 118(1) to the server device(s) 120 over the internet or other network(s). In some implementations, the signal 112 may be sent from the BAN device 110(2) to the server device(s) 120 without using a separate client device 130 as intermediary. In some implementations, the BAN device 110(2) may include a signal analysis component that generates the body signature 118(1) based on the received signal 112, and the BAN device 110(2) may communicate the body signature 118(1) to the server device(s) 120 without using a separate client device 130 as intermediary.

The server device(s) 120 may execute one or more authentication modules 122. The authentication module(s) 122 may receive the body signature 118(1) and compare it to a previously determined body signature 118(2) associated with the individual 102. In some implementations, the body signature 118(2) of an individual 102 may be included in profile information 124 for the individual 102. The profile information 124 may be stored on the server device(s) 120 or elsewhere. In some implementations, the body signature 118(2) may be included in a model of the individual 102, and the model may be developed and refined using any suitable ML technique as described above.

Implementations may employ a ML profiling algorithm that exhibits up to three aspects which may define an artificial intelligence system: learning, remembering, and reasoning. Per the learning aspect, the model may be trained based on a user's biometric data, and may evolve (e.g., be refined) with each use of the model. Per the remembering aspect, storage of the model in the profile information of a user may be efficient and changeable. Per the reasoning aspect, body signature may be analyzed, in some instances in combination with other biometric data, to determine whether any fluctuations are normal or not, and accounting for possible changes in the signature and/or profile over time (e.g., to accommodate changes in the user's body over time).

In some implementations, the authentication module(s) 122 may determine that the individual 102 is successfully authenticated if the body signature 118(1) matches the body signature 118(2). In some implementations, the authentication module(s) 122 may determine that the individual 102 is successfully authenticated if the body signature sufficiently corresponds to the body signature 118(2), such that there is an above-threshold confidence that the individual 102 is who they claim to be (e.g., through the asserted access request). For example, a difference between the waveforms of the body signatures 118(1) and 118(2) may be calculated and authentication may be successful if the difference is below a predetermined threshold. As another example, the frequency components of the waveforms may be compared to determine a different between one or more frequency components, the authentication may be successful if the difference(s) are sufficiently low. In some implementations, an initial signature generation may be performed during a registration process when the user registered with the service. At the state of device usage, the machine learning algorithm may be trained to associate the user's body signature with a new profile created for the user. This may take longer than an authentication using credentials, but in most instances no longer than three minutes.

If authentication is successful, the authentication module(s) 122 may send an access signal 126 to a door controller 128 over one or more networks. The door controller 128 may respond to the access signal 126 by opening the door 104 and allowing the individual 102 to access the secure area. The door controller 128 may include any suitable number and type of components to open a door, such as mechanical, electrical, hydraulic, pneumatic, and/or other types of components.

In some implementations, if authentication not successful the authentication module(s) 122 may communicate the authentication failure to the client device 130. The individual 102 may be prompted to re-attempt authentication by grasping the doorknob 106 again. In some implementations, the individual 102 may be permitted a certain number of failed access attempts before being locked out of further attempts, either permanently or for a predetermined cool-down period (e.g., five minutes).

In some implementations, additional information may be employed to authenticate the individual 102 attempting to access the secure area through the door. For example, location information from the client device 130 may be received by the authentication module(s) 122 and employed to confirm that the individual 102 is actually in proximity to the door 104. As another example, one or more external sensors (e.g., camera, heat sensors, etc.) may be positioned in proximity to the door 104 to confirm the presence of the individual 102 at the door 104.

The implementations depicted in FIG. 1 may be similarly applied to control operations of a smart appliance, vehicle, or other object. For example, the BAN device 110(1) may be placed in the handle of an appliance (e.g., lawnmower) a vehicle, or in a vehicle steering wheel, to ensure that the appliance or vehicle is operable only in response to a successful authentication of the individual 102 based on their body signature 118. In such examples, the access signal 126 may be sent to an onboard computer in the appliance or vehicle, and the onboard computer may respond to the access signal 126 by activating the appliance or vehicle. The implementations depicted in FIG. 1 may be similarly applied to authorize a transaction requested by the individual 102, such as a purchase, funds withdrawal, funds transfer, and so forth. In such instances, the BAN device 110(1) may be included in a POS terminal, ATM, vending machine, service kiosk, or other object. The access signal 126 may be sent to the object to indicate that the individual's identity has been verified and to authorize the transaction requested by the individual 102.

In some instances, the access signal may also communicate or be associated with personalized settings for the individual 102. For example, if the individual 102 is entering a vehicle, the access signal may include or otherwise be associated with settings to adjust the seat position, mirrors, steering wheel, and/or other objects to positions previously set for the individual 102.

Figure 2:
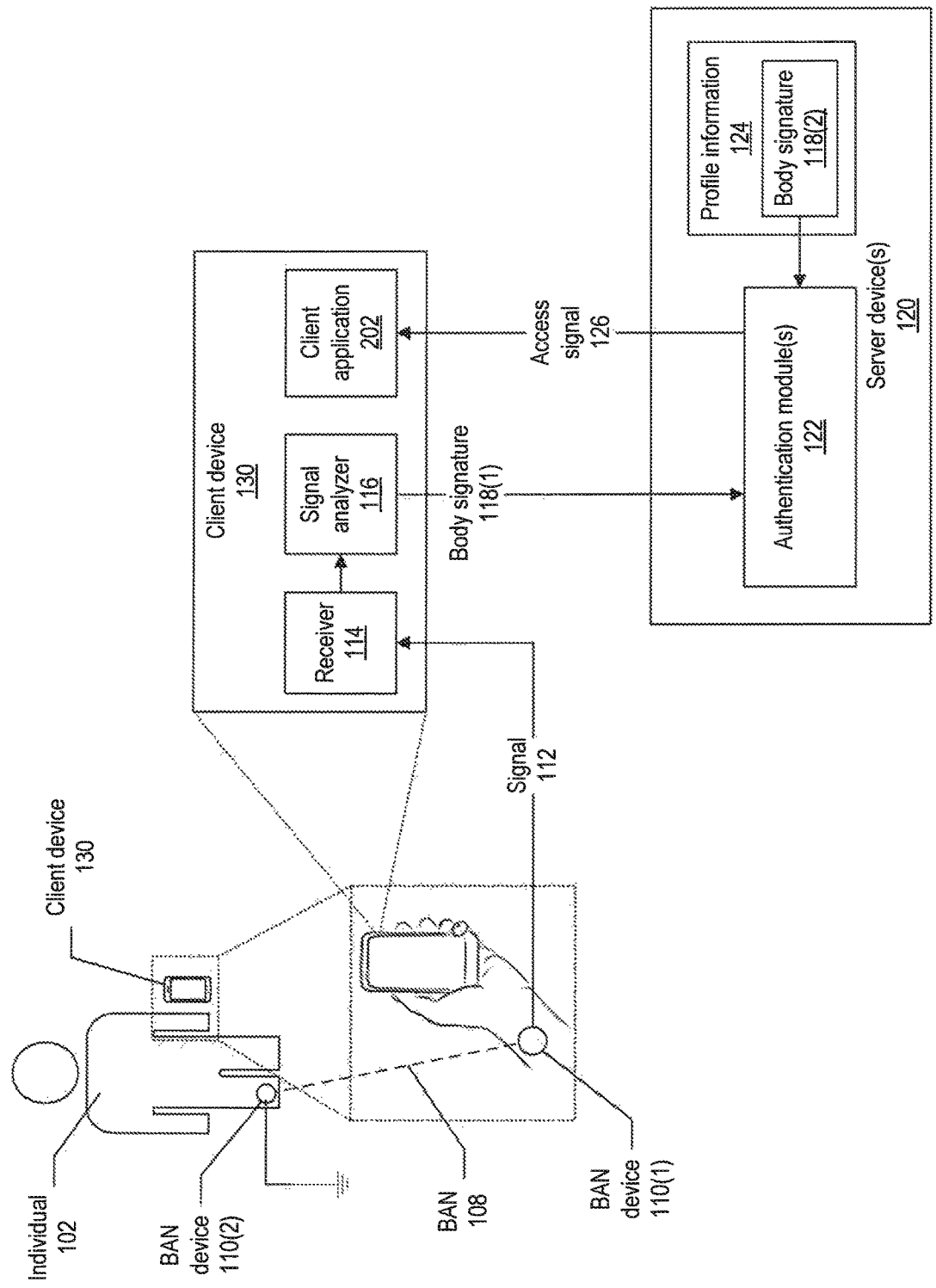
FIG. 2 depicts an example system for authentication based on a signal transmitted through an individual's body, according to implementations of the present disclosure.

FIG. 2 depicts an example system for authentication based on a signal transmitted through an individual's body, according to implementations of the present disclosure. The elements shown in FIG. 2 may be configured similarly to like-numbered elements in FIG. 1, and may perform similar operations as those performed by like-numbered elements in FIG. 1. In the example of FIG. 2, the individual's body signature 118 may be employed to authenticate the individual 102 to access (e.g., log in to) a client application 202 executing on the client device 130. Similarly, the individual's body signature 118 may be employed to authenticate the individual 102 to access secure data, secure sections of the client application 202, or to activate (e.g., unlock) the client device 130 itself In some implementations, the BAN 108 may include multiple wearable BAN devices 110. In the example of FIG. 2, the BAN 108 connects a BAN device 110(1) such as an epidermal patch and a second BAN device 110(2), e.g., located on the individual's foot. The second BAN device 110(2) may be in contact with ground (e.g., electrical ground). The BAN device 110(1) may send the signal 112 which propagates through the individual's body to the BAN device 110(2). Alternatively, the signal 112 may be sent from the BAN device 110(2) to the BAN device 110(1). The received signal 112 may be communicated over the BAN 108 to the client device 130, which may process the signal 112 as described above. The client device 130 may provide the body signature 118(1) to the authentication module(s) 122, which may authenticate the individual 102 based on a correspondence between the body signatures 118(1) and 118(2) as described above. If authentication is successful, the access signal 126 may be sent to instruct the client application 202 to allow the individual 102 the requested access to the application 202 or the client device 130 itself. If authentication is not successful, a failure notification may be communicated to the client device 130 for presentation on the client device 130.

In some implementations, the signal 112 may be transmitted between the BAN devices 110 in response to the client device 130 being held by the individual 102. In some implementations, the signal 112 may be transmitted between the BAN devices 110 in response to a particular gesture or command of the individual 102 to request access to the client application 202 and/or client device operating system. Accordingly, the signal 112 may not be transmitted through the individual's body unless the individual 102 is attempting an access, to the client device 130 and/or client application 202, that requires an authentication of the individual 102.

Figure 3:
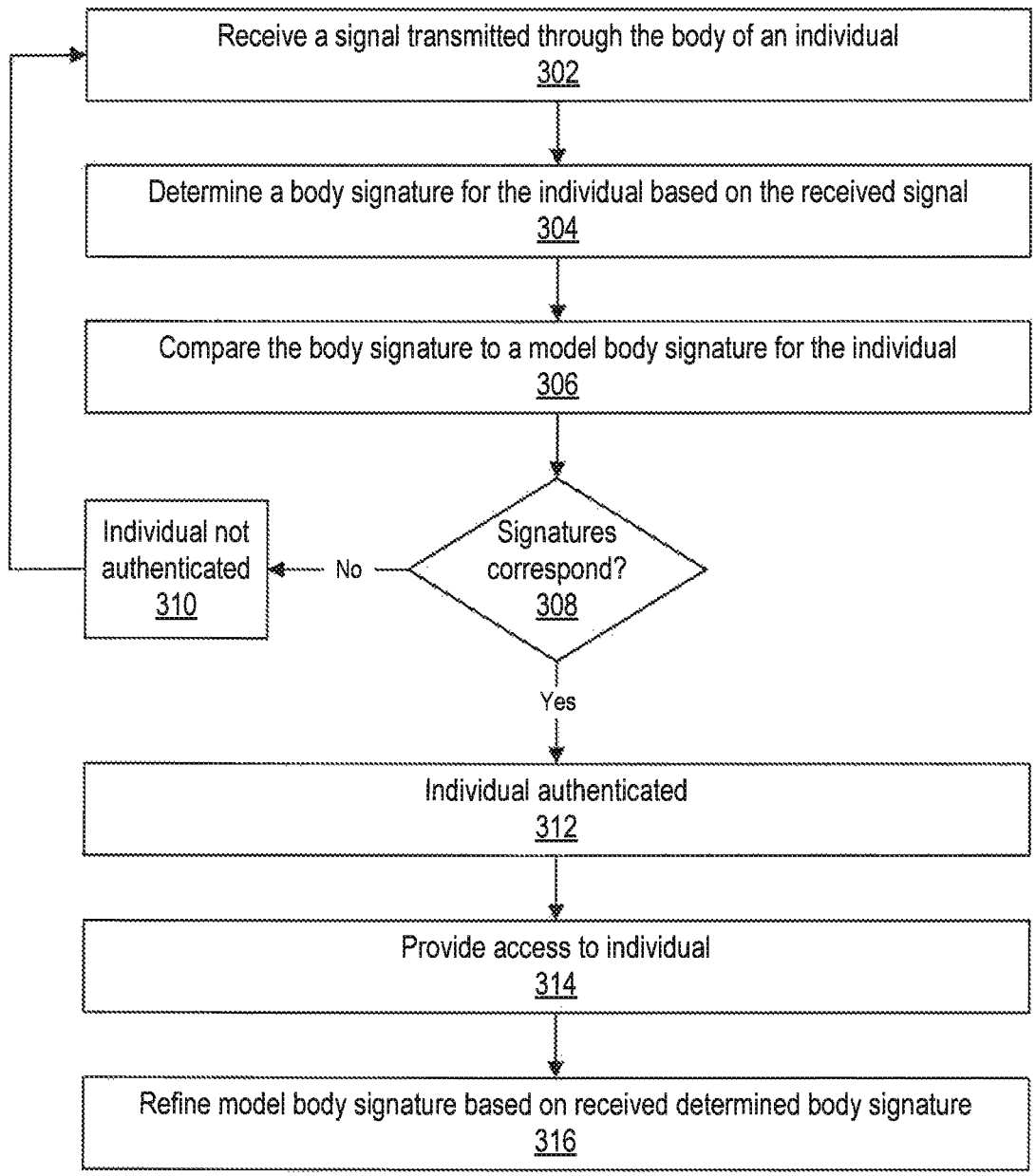
FIG. 3 depicts a flow diagram of an example process for authentication based on a signal transmitted through an individual's body, according to implementations of the present disclosure.

FIG. 3 depicts a flow diagram of an example process for authentication based on a signal transmitted through an individual's body, according to implementations of the present disclosure. Operations of the process may be performed by one or more of the signal analyzer 116, the authentication module(s) 122, the client application 202, and/or other software module(s) executing on the client device 130, the BAN device(s) 110, the server device(s) 120, or elsewhere.

A signal 112 may be received (302). As described above, the signal 112 may be transmitted through at least a portion of the body of the individual 102. The signal 112 may be an electrical signal, a vibrational signal, or other suitable type of signal.

The received signal 112 may be employed to determine (304) a body signature 118 for the individual 102. As described above, the body signature 118 may reflect the unique manner in which the particular physiology of the individual 102 alters the signal 112 as it propagates through the individual's body. Accordingly, the body signature 118 may correspond, in some instances uniquely, to the individual 102.

The determined body signature 118 may be compared (306) to a previously determined and stored (e.g., model) body signature 118 of the individual 102. If the body signatures 118 correspond (308), the individual 102 may be determined to be successfully authenticated (312). In such instances, the requested access may be provided (314) to the individual 102. If the signatures do not correspond, the individual 102 may not be authenticated (310). In some implementations, the process may return to 302 and allow one or more subsequent attempts at authentication.

In some implementations, the correspondence between the body signatures 118 may be exact for successful authentication. In some implementations, the correspondence may be fuzzy or approximate, to allow for some (e.g., below threshold) difference between the body signatures 118. Such fuzziness may account for certain minor and inherent differences in the propagation of a signal 112 through the individual's body between instances of propagation. As described above, in some implementations the model body signature 118(2) of an individual 102 may be refined (316) or otherwise adjusted if a current body signature 118(1) differs from the model, when such differences are below threshold to permit successful authentication. In this way, implementations may account for the changes in an individual's body signature 118 over time.

Implementations may enable authentication of an individual 102 based on their body signature 118. In some instances, the body signature 118 may be employed in combination with other forms of authentication to achieve greater confidence in an authentication result. For example, the body signature 118 may be employed in combination with credential-based authentication using a login, password, PIN, knowledge-based question answers, and/or other types of credentials, token-based authentication (e.g., OAuth), and so forth. The body signature 118 may also be employed in combination with other types of biometric authentication, such as authentication based on fingerprints, retinal scans, heartbeat detection, neural activity (e.g., brain wave) patterns, voice print analysis, body chemistry measurement, facial recognition, and so forth.

Figure 4:
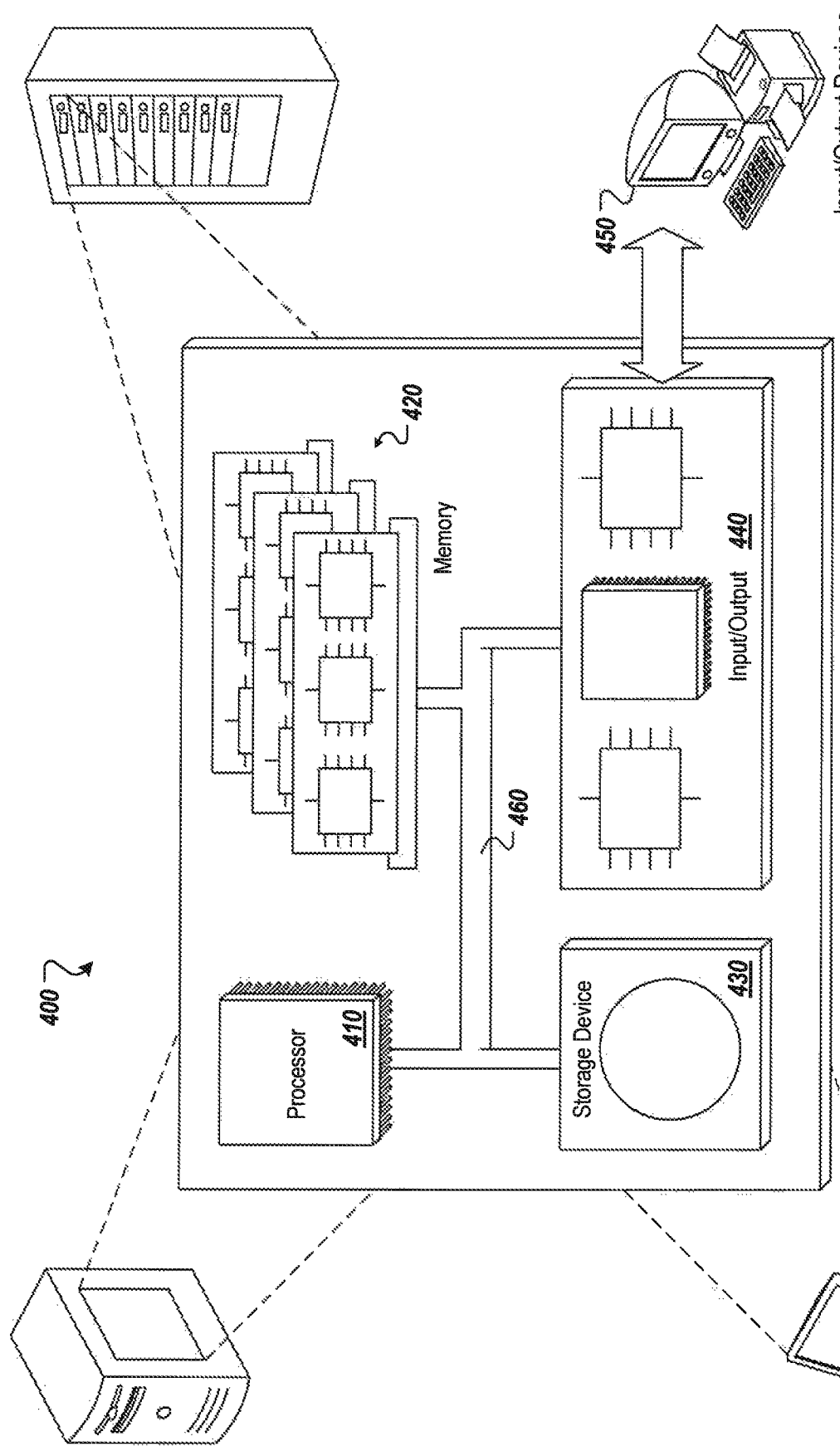
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in one or more of the client device 130, the server device(s) 120, the BAN device(s) 110, and/or other device(s) described herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system, comprising:
a transmitting device configured to transmit a first body area network (BAN) signal;
a sensing device configured to:
  detect a presence of a user prior to the user contacting a transmitting device, wherein the presence is detected in response to the user being within a proximity of the transmitting device; and
  cause the transmitting device to transmit the first BAN signal in response to detecting the presence;
an audio device configured to be disposed on the user, wherein the audio device is configured to receive a second BAN signal, wherein the first BAN signal is transmitted through an ear canal of the user and received by the audio device as the second BAN signal; and
a client device configured to:
  receive the second BAN signal from the audio device;
  generate a body signature for the user based on the second BAN signal and a model body signature associated with the user, wherein the model body signature is updated after each instance of the user physically contacting the transmitting device to track one or more changes to the body signature over time; and
  authenticate the identity of the user based on the body signature.

2. The system of claim 1, wherein the client device is configured to generate the body signature based on a difference between the first BAN signal and the second BAN signal.

3. The system of claim 1, wherein the one or more changes correspond to one or more humidity levels.

4. The system of claim 1, wherein the client device is part of the audio device.

5. The system of claim 1, wherein the audio device comprises a headphone, a hearing aid, or both.

6. The system of claim 1, wherein the first BAN signal comprises a vibrational signal.

7. A system, comprising:
a first transmitting device configured to transmit a first body area network (BAN) signal;
a sensing device configured to:
  detect a presence of a user prior to the user contacting a transmitting device, wherein the presence is detected in response to the user being within a proximity of the transmitting device; and
  cause the transmitting device to transmit the first BAN signal in response to detecting the presence;
a bracelet device configured to be disposed on the user, wherein the bracelet device is configured to receive a second BAN signal, wherein the first BAN signal is transmitted through a wrist of the user and received by the bracelet device as the second BAN signal; and
a client device configured to:
  receive the second BAN signal from the bracelet device;
  generate a body signature for the user based on the second BAN signal and a model body signature associated with the user, wherein the model body signature is updated after at least one instance of the user physically contacting the transmitting device to track one or more changes to the body signature over time; and
  authenticate the identity of the user based on the body signature.

8. The system of claim 7, wherein the model body signature is determined based on a machine learning algorithm configured to refine the model body signature after the client device authenticates an identity of the user.

9. The system of claim 7, wherein the client device is configured to generate the body signature based on a difference between the first BAN signal and the second BAN signal.

10. The system of claim 7, wherein the client device is part of the bracelet device.

11. The system of claim 7, wherein the body signature corresponds to a density of the wrist, a size of the wrist, or both.

12. The system of claim 7, wherein the first BAN signal comprises a vibrational signal.

13. A system, comprising:
a transmitting device configured to transmit a first body area network (BAN) signal;
a sensing device configured to:
  detect a presence of a user prior to the user contacting a transmitting device, wherein the presence is detected in response to the user being within a proximity of the transmitting device; and
  cause the transmitting device to transmit the first BAN signal in response to detecting the presence;
an earring device configured to be disposed on the user, wherein the earring device is configured to receive a second BAN signal, wherein the first BAN signal is transmitted through an earlobe of the user and received by the earring device as the second BAN signal; and
a client device configured to:
  receive the second BAN signal from the earring device;
  generate a body signature for the user based on the second BAN signal and a model body signature associated with the user, wherein the model body signature is updated after at least one instance of the user physically contacting the transmitting device to track one or more changes to the body signature over time; and
  authenticate the identity of the user based on the body signature.

14. The system of claim 13, wherein the model body signature is determined based on a machine learning algorithm configured to refine the model body signature after the client device authenticates an identity of the user.

15. The system of claim 13, wherein the client device is configured to generate the body signature based on a difference between the first BAN signal and the second BAN signal.

16. The system of claim 13, wherein the client device is part of the earring device.

17. The system of claim 13, wherein the body signature corresponds to earlobe density, blood flow, heart rate, heart rhythm patterns, or any combination thereof.

18. The system of claim 13, wherein the first BAN signal comprises a vibrational signal.

\* \* \* \* \*